UNITED STATES PATENT OFFICE.

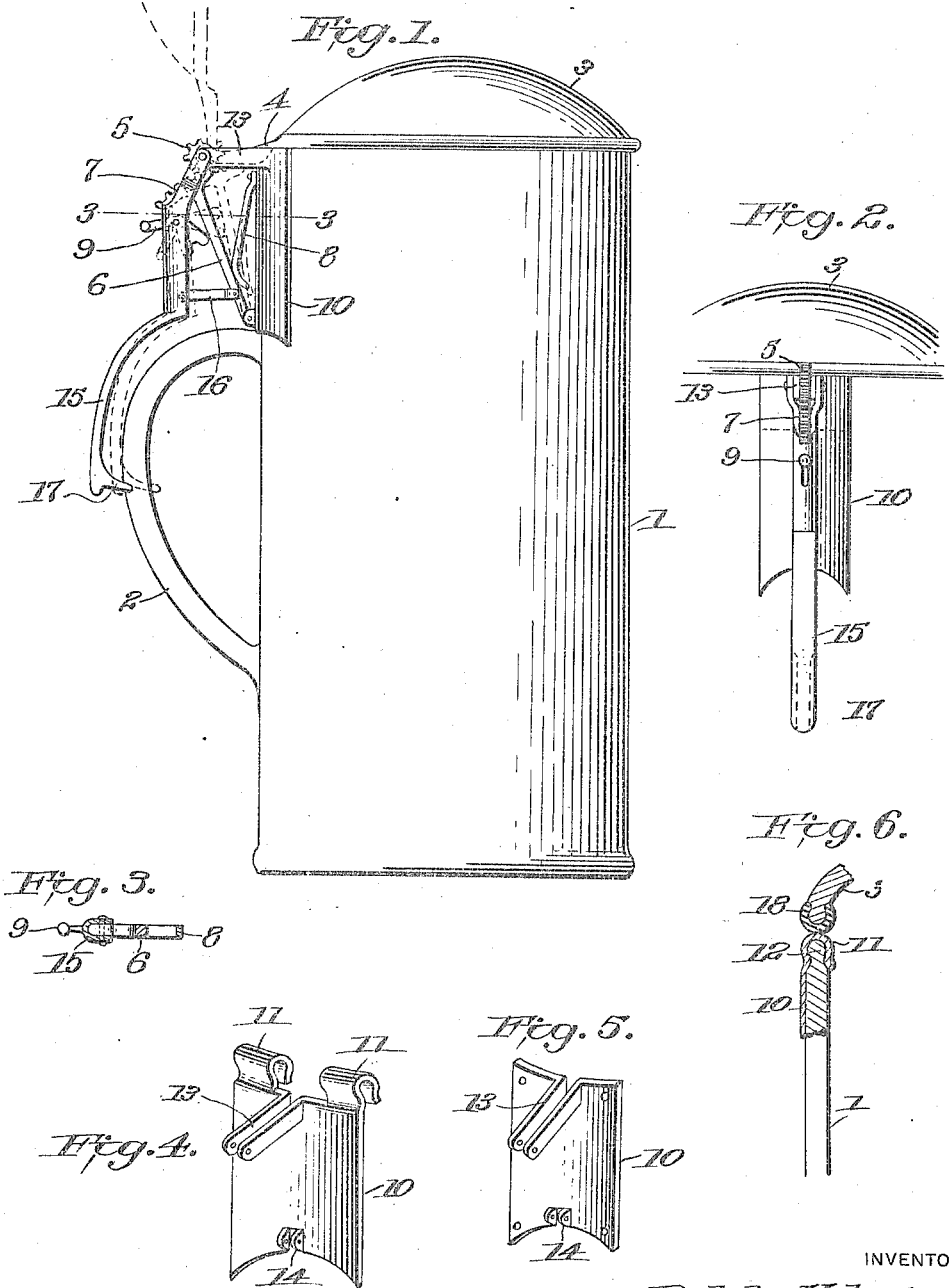

RALPH VALENT, OF POCATELLO, IDAHO.

COVER-OPERATING MEANS.

1,291,284.                Specification of Letters Patent.     Patented Jan. 14, 1919.

Application filed August 20, 1918. Serial No. 250,672.

*To all whom it may concern:*

Be it known that I, RALPH VALENT, a citizen of the United States, residing at Pocatello, in the county of Bannock and State of Idaho, have invented certain new and useful Improvements in Cover-Operating Means, of which the following is a specification.

The invention relates to receptacles having covers, such as pitchers, coffee pots, sugar bowls, and the like, and more particularly to means for operating such covers, whereby access to the contents of the receptacle may be readily and quickly had and whereby the cover will automatically close so as to prevent dust, and insects from entering the receptacle.

The invention provides means whereby the cover may be manipulated by the same hand which grasps the receptacle when lifting it into convenient position for obtaining the contents thereof, the cover closing automatically, and said means embodying a detent to be thrown into position to hold the cover open when filling the receptacle or for other purposes.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter.

In the drawing:—

Figure 1 is a view in elevation of a receptacle provided with cover operating means embodying the invention, the full lines showing the relation of the parts when the cover is closed, and the dotted lines indicating the relative position of the parts when the cover is open and locked, Fig. 2 is a front view of the cover operating means showing a portion of the cover, Fig. 3 is a detail in horizontal section on the line 3—3 of Fig. 1 showing more clearly the relationship of the detent or cover locking means, Fig. 4 is a perspective view of the base to which the operating parts are connected, Fig. 5 is a perspective view of a modified form of base, and Fig. 6 is a sectional detail of a portion of the cover and receptacle showing the manner of attaching the base thereto and the edge of the cover protected.

Corresponding and like parts are referred to in the following description and indicated in the several views of the drawings by like reference characters.

The receptacle 1 may be of any design of construction usually provided for receiving syrup, milk, sugar, or the like, the same being provided with a handle 2 and a cover 3. These parts may be of any well known construction and are shown simply as means to illustrate the application of the invention.

An arm 4 projects laterally from a side of the cover 3 and is provided at its outer end with cog teeth 5. An arm 6 pivotally supported at one side of the receptacle 1 extends upwardly and is provided at its upper end with cog teeth 7 which mesh with the cog teeth 5 of the arm 4. The arms 4 and 6 and the coöperating cog teeth 5 and 7 are of such relation that pivotal movement of the arm 6 effects an opening and a closing movement of the cover, as indicated most clearly by the dotted lines in Fig. 1. A spring 8 normally exerts an outward pressure on the arm 6 so as to hold the cover 3 closed. When it is required to hold the cover 3 in an open position as indicated by the dotted lines in Fig. 1, a detent 9 is provided and is adapted to engage the outer side of the arm 6 so as to hold the arm 6 pressed inward. The detent 9 is pivotally supported midway of its ends and its outer end projects to form a finger piece and its inner end is notched to prevent displacement of the detent when in engagement with the arm 6 to hold the cover in open position. The inner end of the detent 9 is heavier than the outer end so as to normally hold the detent out of active position so that the cover may close readily when released from the pressure exerted to open the same.

The arm 4 may form a part of the cover 3 or may be attached thereto in any manner. The spring 8 and arm 6 are attached to a base 10 usually consisting of a plate which is adapted to be attached to the receptacle 1 in any manner. In its simplest form, as shown in Fig. 5, the base 10 is provided with openings near its four corners to receive suitable fastening means. In the form shown most clearly in Fig. 4 the base 10 is provided at its upper edge with spring clips 11 which are adapted to engage the edge portion of the receptacle, as indicated most clearly in Fig. 6, said receptacle having its upper edge forming a bead 12 about which the spring clips 11 snap so as to hold the base 11 in firm position. A pair of arms 13 are provided at the top of the base 10 to receive the arm 4. A pair of ears 14 are provided at the lower end of the base to receive the arm 6. The spring is disposed in pendent position whereas the arm 6 inclines upwardly and outwardly from its lower end.

The detent 9 is pivotally supported upon a lever 15 which is forked at its upper end and is pivoted to the outer ends of the arms 4 and 13 co-axially with the cog teeth 5. The upper forked end of the lever 15 embraces the toothed portions of the arms 4 and 6 thereby holding the same in alinement. A link 16 connects the lever 15 with the arm 6. The upper portion of the lever 15 is made hollow as shown most clearly in Fig. 3 and receives the detent 9 and the outer end of the link 16. The lower portion of the lever 15 is curved and terminates in a fork 17 which is adapted to embrace a portion of the handle 2 when the lower end of the lever is pressed inward to open the cover thereby preventing lateral displacement of the lever. By having the lower portion of the lever 15 curved, it conforms approximately to the shape of the handle 2 thereby enabling the parts to be conveniently grasped.

The lower edge of the cover 3 is preferably protected by having a contact strip 18 of rubber or other material fitting thereto as shown most clearly in Fig. 6. It will be understood the cover operating means may be readily applied to any variety of receptacle having a cover so that the latter may be easily and conveniently opened and closed. Under normal conditions, the cover is held closed by the action of the spring 8, and when it is required to gain access to the contents of the receptacle, the lower end of the lever 15 is pressed upon, the cover 3 is thrown open, the thumb of the same hand grasping the handle, may be brought into position to exert a downward pressure upon the finger piece of the detent 9 thereby throwing the inner end of such detent upward into engaging position with the arm 6, whereby the cover is held open as indicated by the dotted lines in Fig. 1. Under ordinary conditions, pressure upon the lower portion of the lever 15 opens the cover, and when the pressure is released the lower end of the lever 15 moves outward under the action of the spring 8 thereby closing the cover.

It will be understood that the invention is of a nature to be easily applied to receptacles of any nature, thereby insuring a closing of the cover thereof and protecting the contents of the receptacle from insects, dust, and other foreign matter.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. In combination with a receptacle and a cover therefor, an arm projecting from the cover and having a toothed portion, a second arm having pivotal connection with the receptacle and provided with a toothed portion coöperating with the arm carried by the cover, and an operating member having pivotal connection with the arm carried by the cover and connected with the arm mounted upon the receptacle.

2. In combination with a receptacle and a cover therefor, an arm projecting from the cover and having a toothed portion, a second arm having pivotal connection with the receptacle and provided with a toothed portion coöperating with the arm carried by the cover, an operating member having pivotal connection with the arm carried by the cover, and a link connecting the operating member with the arm mounted upon the receptacle.

3. In combination with a receptacle and a cover therefor, an arm projecting from the cover and having a toothed portion, a second arm having pivotal connection with the receptacle and provided with a toothed portion coöperating with the arm carried by the cover, an operating member having connection with the two arms, and a detent mounted upon the operating member and adapted to engage the arm having pivotal connection with the receptacle to hold the cover in open position.

4. In combination with a receptacle and a cover therefor, an arm projecting from the cover and having a toothed portion, a second arm having pivotal connection with the receptacle and provided with a toothed portion coöperating with the arm carried by the cover, an operating lever having pivotal connection with the arm carried by the cover, a link connecting the operating member with the arm mounted upon the receptacle, and a detent mounted upon the operating member and adapted to engage the arm mounted upon the receptacle to hold the cover in open position.

5. In combination with a receptacle and a cover therefor, an arm projecting from the cover and having a toothed portion, a second arm having pivotal connection with the receptacle and provided with a toothed portion coöperating with the arm carried by the cover, and an operating member having connection with the two arms and having its lower portion curved and terminating in a fork to engage a handle of the receptacle to prevent lateral displacement of the operating member when pressed upon to hold the cover open.

In testimony whereof I affix my signature in presence of two witnesses.

RALPH VALENT.

Witnesses:
 WM. H. JACKSON, Jr.,
 H. C. LARSEN.

Copies of this patent may be obtained for five cents each, by addressing the "Commissioner of Patents, Washington, D. C."